Figure 1:
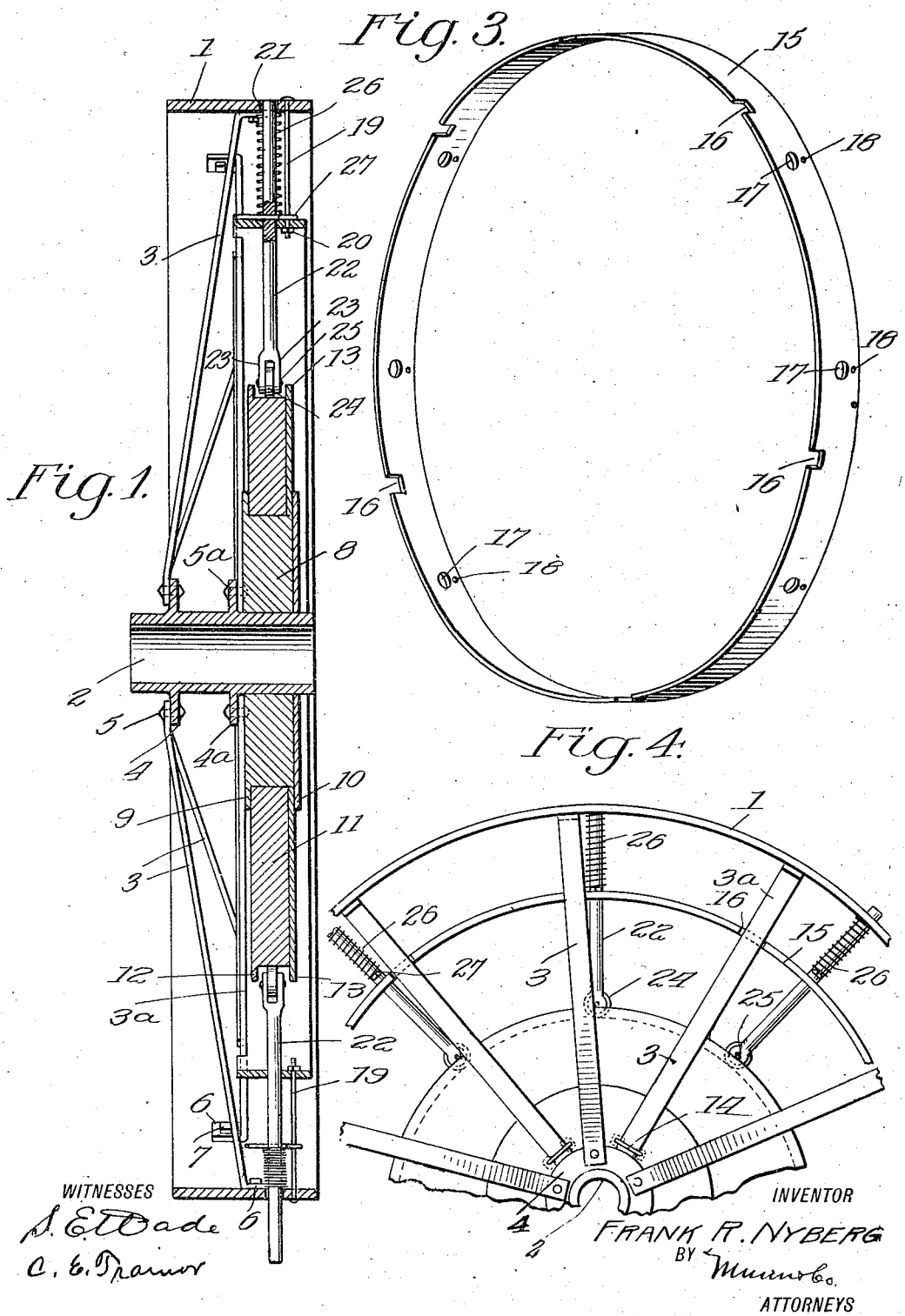

F. R. NYBERG.
ATTACHMENT FOR ENGINES.
APPLICATION FILED AUG. 11, 1914.
1,142,612.
Patented June 8, 1915.
2 SHEETS—SHEET 2.
Fig. 2.
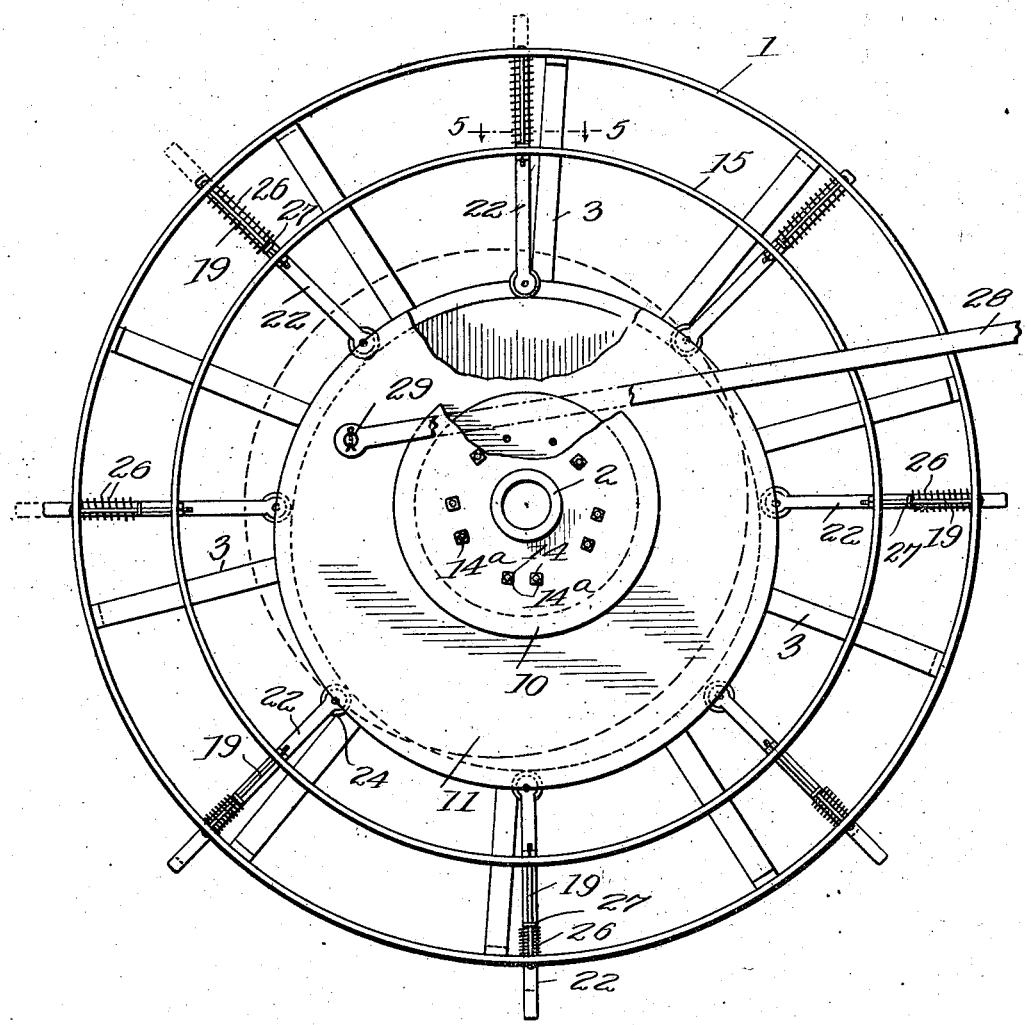
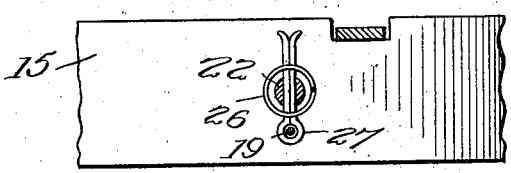
Fig. 5.
WITNESSES
INVENTOR
FRANK R. NYBERG
BY
ATTORNEYS

UNITED STATES PATENT OFFICE.

FRANK RUDOLPH NYBERG, OF LAMAR, COLORADO, ASSIGNOR OF ONE-HALF TO GEORGE J. GARVIN, OF LAMAR, COLORADO.

ATTACHMENT FOR ENGINES.

1,142,612.

Specification of Letters Patent. Patented June 8, 1915.

Application filed August 11, 1914. Serial No. 856,232.

*To all whom it may concern:*

Be it known that I, FRANK R. NYBERG, a citizen of the United States, and a resident of Lamar, in the county of Prowers and State of Colorado, have invented a new and useful Improvement in Attachments for Engines, of which the following is a specification.

My invention is an improvement in wheels for traction engines, and the like, and has for its object to provide mechanism in connection with the usual drive wheel, for permitting the mud cleats usually used on the periphery of the wheel to be dispensed with, and wherein the said mechanism is so arranged that it may be brought into and out of operative position whenever desired.

In the drawings, Figure 1 is a vertical section through a wheel provided with the attachment, Fig. 2 is a side view of the wheel with parts broken away, Fig. 3 is a perspective view of the attaching ring, Fig. 4 is a partial side view showing the parts in another position, and Fig. 5 is a section on the line 5—5 of Fig. 2, looking in the direction of the arrows adjacent to the line.

The present embodiment of the invention is shown in connection with a wheel having a rim 1, a hub 2, and spokes 3 and $3^a$ connecting the hub and rim. Two series of spokes are provided, the series 3 being inclined, and the series $3^a$ being perpendicular to both rim and hub. The hub 2 is provided with annular ribs 4 and $4^a$, and the spokes of series 3 are connected at their inner ends to the rib 4 by rivets 5 or the like. The outer ends of the spokes of series 3 and $3^a$ are provided with lateral lugs 6 which abut the inner surface of the rim 1, and are secured thereto by means of bolts or rivets 7. The inner ends of the spokes of series $3^a$ are secured to the rib $4^a$, by rivets $5^a$, similar to the rivets 5, before mentioned.

It will be noted from an inspection of Fig. 1, that the rib 4 is at one edge of the rim 1 of the wheel, and that the rib $4^a$ is at approximately the center of the width of the rim, so that a portion of the interior of the wheel, between the rim 1 and the hub 2 is left free and unobstructed for the insertion of the attachment. This attachment comprises a ring 8 having a central opening fitting the hub 2, and the ring is provided at its inner face with a marginal flange 9. A disk 10 is fitted onto the hub against the outer face of the ring 8, and the disk 10 extends beyond the periphery of the ring 8, to a point flush with the periphery of the flange 9.

The ring 8 fits against the outer faces of the spokes of series $3^a$ and an eccentric 11 is mounted on the ring, between the flange 9 and the disk 10. The eccentric 11 is mounted to rotate on the ring, or at least to move angularly with respect thereto, and the said eccentric is provided with a marginal flange 12 at its inner face. A ring 13 is fitted onto the ring against the outer face of the eccentric, and the said ring 13 fits the peripheral surface of the ring 8. The disk 10 fits outside of the inner edge of the ring 13 to hold it in place, and the disk 10 is secured in place by means of clips 14, each of which embraces a spoke $3^a$ and passes through the ring 8 and the disk 10, and the arms of each clip are engaged by nuts $14^a$ on the outer face of the disk 10.

A ring 15 is arranged between the peripheral surface of the eccentric and the rim 1, the said ring having notches 16 in its inner edge for receiving the spokes of series $3^a$. The ring is also provided with openings 17 arranged at spaced intervals, and radial to the ring, and adjacent to each of the openings 17 a smaller opening 18 is provided. The openings 18 are adapted to register with similar openings in the rim 1, and bolts 19 are passed through the openings of the rim, and the openings 18 of the ring, and each bolt is engaged by a nut 20 on the inner face of the ring. The ring is thus held in spaced relation with respect to the rim. The openings 17 of the ring are adapted to register with similar openings 21 in the rim 1, and dogs 22 are mounted to move radially in the registering openings 17 and 21. Each of the dogs 22 is provided at its inner end with a fork, and the arms 23 of the fork extend on opposite sides of a roller or wheel 24, and the wheel is journaled between the arms on a journal pin 25. The rollers 24 engage the peripheral surface of the eccentric, between the flange 12 and the ring 13.

A coil spring 26 encircles each dog between the rim 1 and a cotter pin 27 extending transversely through an opening in the dog, and the cotter pins are so arranged with respect to the dogs, that said pin will engage the peripheral surface of the ring 15 when the outer end of the dog is flush with the peripheral surface of the rim 1. The eye of each cotter pin 27 encircles the adjacent rod 19, and the rod acts thus as a guide for the cotter pin. The springs 26 act normally to force the dogs inwardly, and the cotter pins limit the inward movement of the dogs. A lever 28 is pivoted at one end to a wrist pin 29 on the eccentric 11, and the other end of the lever extends to the platform of the engine, in convenient position to be grasped by the engineer, to move the eccentric.

In operation, when the engine is moving on the road, the ring 8 turns with the wheel proper, while the eccentric 11 remains stationary, and with the point of highest eccentricity downward as indicated in Fig. 2. With this arrangement, as each of the dogs 22 begins to move downward at the front of the wheel, it will be gradually extended by the eccentric, until at the lowest point of the wheel it will be fully extended, as indicated in said figure. As the dog begins to move upward at the rear of the wheel, the spring 26 adjacent thereto will begin to force the dog inwardly, until when the dog reaches the top of the wheel, it will be flush with the periphery thereof. When it is not necessary to use the dogs to hold the wheel from slipping, the point of highest eccentricity is upward, the lever 28 being operated to turn the eccentric to this position.

It will be obvious that the eccentric may be moved to any desired position, and since the dogs whatever the position of the eccentric, are continuously moving inward and outward, they will be kept free from the mud, and in the best possible condition for use. The rods 19 hold the rollers 24 and the inner ends of the dogs at proper position with respect to the eccentric so that there is no binding between the dogs and the openings through which they move.

I claim:

1. A device of the character specified, in combination with the wheel having a hub and a rim, and spokes connecting the hub and rim, of a ring fitting one end of the hub and having a radial flange at its inner face, an eccentric journaled on the said ring and having a radial flange at its inner face, a ring fitting the outer face of the eccentric and extending beyond the periphery thereof, a disk fitting the hub against the outer face of the ring and extending beyond the periphery thereof to hold the eccentric and the ring in place, a ring arranged between the wheel rim and the eccentric, and having notches for receiving the spokes, said ring and the rim of the wheel having registering radial openings, a dog moving in each pair of registering openings and having at its inner end a roller bearing against the periphery of the eccentric, rods connecting the ring to the rim, each rod being adjacent to a dog, stops extending transversely of the dogs and having eyes engaging the adjacent rods, springs encircling the dogs between the stops and the rim, and normally forcing the dogs inwardly, and means connected with the eccentric for shifting the same angularly with respect to the wheel.

2. The combination with a wheel having a rim and a hub and having spokes connecting the rim and the hub, of a disk mounted on the hub, an eccentric mounted on the disk, a ring connected with the wheel within the rim, said ring and rim having registering openings, and dogs arranged radially of the rim and ring and engaging the registering openings, springs normally forcing the dogs inward, the inner ends of the dogs engaging the periphery of the eccentric, and the said eccentric continuously moving the dogs outward when the wheel is moving, and means for shifting the eccentric angularly on the disk and for holding the eccentric from movement with the wheel to cause the said eccentric to extend the dogs at one part of the wheel.

FRANK RUDOLPH NYBERG.

Witnesses:
C. C. HUDDLESTON,
I. H. MYERS.

Copies of this patent may be obtained for five cents each, by addressing the "Commissioner of Patents, Washington, D. C."